(12) United States Patent
Trump

(10) Patent No.: US 12,289,371 B1
(45) Date of Patent: Apr. 29, 2025

(54) EFFICIENTLY MANAGING THE STORAGE OF DIGITAL MEDIA ASSET LIBRARIES ON BEHALF OF A GROUP OF USERS

(71) Applicant: Tympanon LLC, Seattle, WA (US)

(72) Inventor: Jason Trump, Seattle, WA (US)

(73) Assignee: Tympanon LLC, Seattle, WA (US)

( * ) Notice: Subject to any disclaimer, the term of this patent is extended or adjusted under 35 U.S.C. 154(b) by 0 days.

(21) Appl. No.: 18/798,553

(22) Filed: Aug. 8, 2024

(51) Int. Cl.
*H04L 67/1097* (2022.01)
*G06F 21/62* (2013.01)

(52) U.S. Cl.
CPC ...... *H04L 67/1097* (2013.01); *G06F 21/6218* (2013.01)

(58) Field of Classification Search
CPC .................. G06F 21/6218; H04L 67/1097
See application file for complete search history.

(56) References Cited

U.S. PATENT DOCUMENTS

| | | | | |
|---|---|---|---|---|
| 8,005,277 B2 * | 8/2011 | Tulyakov | ........... | G06V 40/1353 382/125 |
| 8,396,841 B1 * | 3/2013 | Janakiraman | ......... | G06F 3/0608 707/802 |
| 8,577,851 B2 * | 11/2013 | Vijayan | .............. | G06F 3/0608 711/216 |
| 8,769,627 B1 * | 7/2014 | Guo | .................... | G06F 11/1453 726/20 |
| 9,020,900 B2 * | 4/2015 | Vijayan Retnamma | ..................... | G06F 16/22 707/698 |
| 9,348,993 B2 * | 5/2016 | Wang | ................... | H04N 21/835 |
| 9,571,287 B2 * | 2/2017 | Narayanamurthy | ........................ | H04L 67/1097 |
| 11,218,296 B2 * | 1/2022 | Gottipati | ............... | G06F 3/0623 |
| 2013/0104247 A1 * | 4/2013 | Cakulev | .................. | H04L 63/12 726/29 |
| 2017/0372042 A1 * | 12/2017 | Isles | ...................... | H04L 9/3247 |

* cited by examiner

*Primary Examiner* — G. C. Neurauter, Jr.
(74) *Attorney, Agent, or Firm* — Seed Intellectual Property Law Group LLP

(57) ABSTRACT

A facility for adding a media asset to a media library on behalf of a user is described. The facility identifies an original media asset in local storage, and extracts metadata from it. From a copy of the first original media asset, the facility removes the extracted metadata; reorders the remaining contents to conform their order to a standardized order; and updates at least one internal reference to reflect the removing and the reordering, to produce a normalized first media asset. The facility determines a hash value for the normalized media asset, and transmits it to a server. The facility receives from the server a challenge specifying a subrange of positions in the normalized media asset. The facility transmits to the server (a) the contents of the normalized first media asset in the specified subrange of positions, and (b) the metadata extracted from the first original media asset.

28 Claims, 12 Drawing Sheets

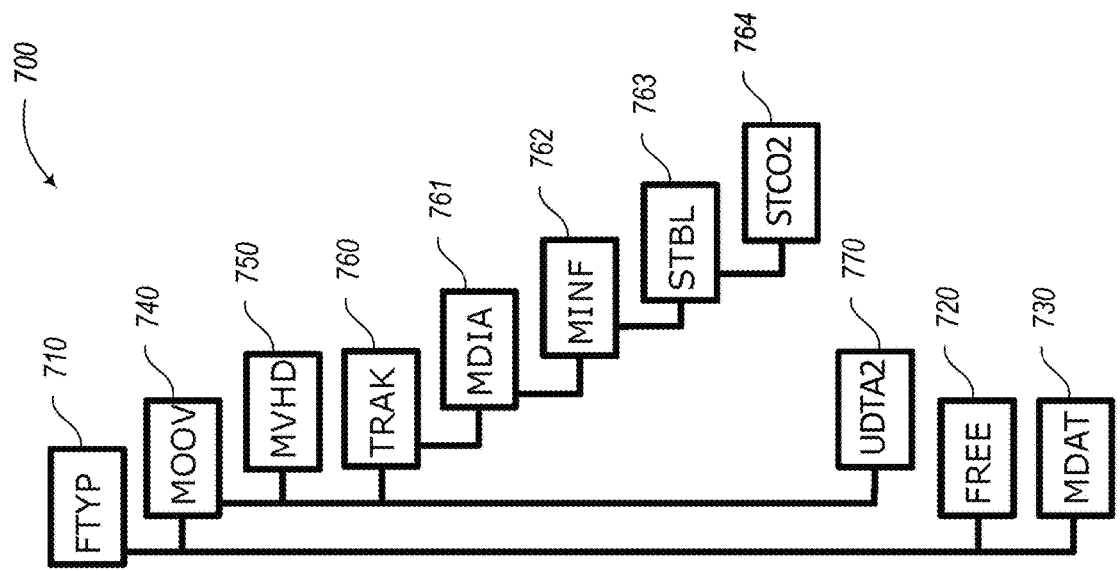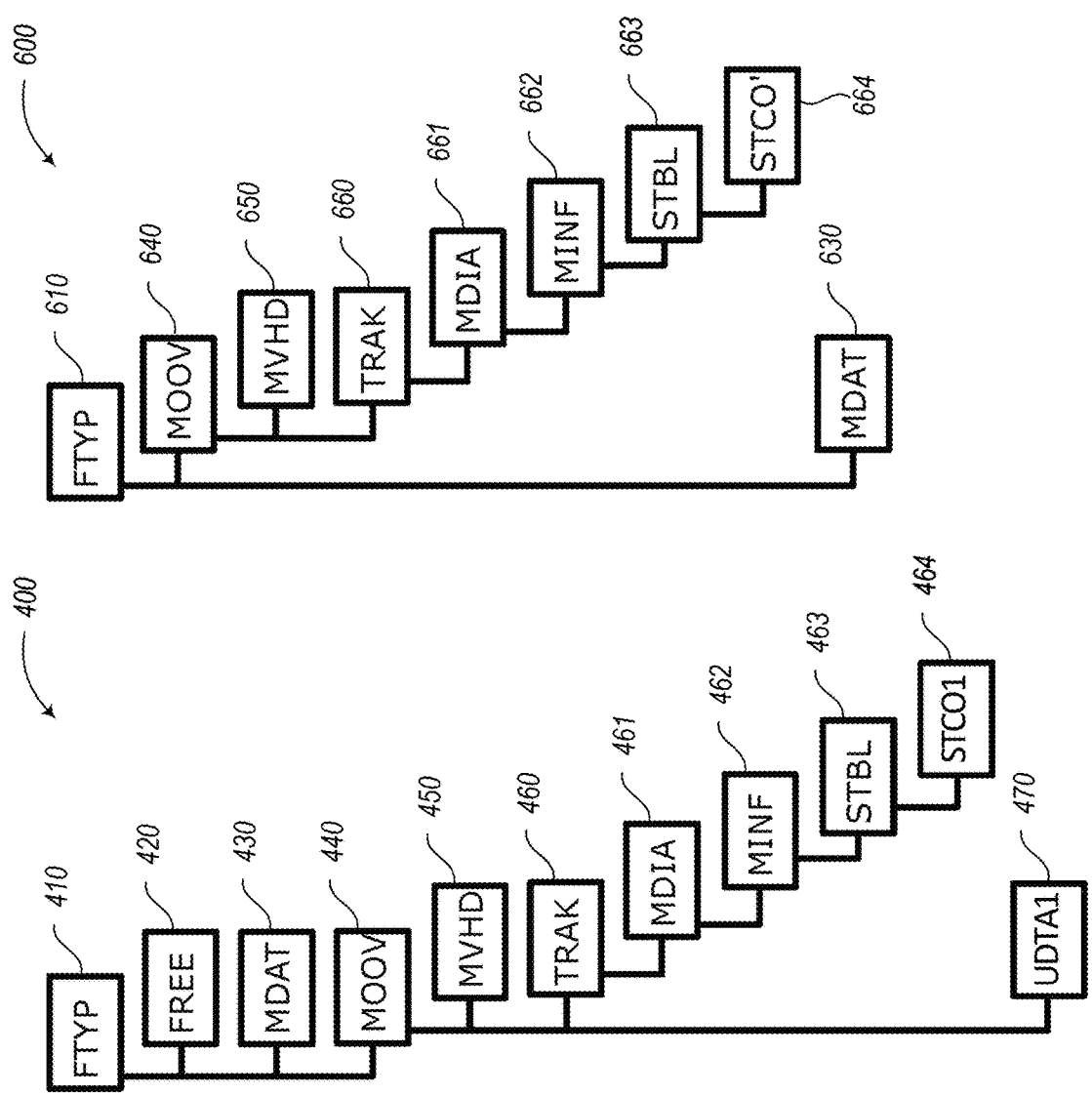

EFFICIENTLY MANAGING THE STORAGE OF DIGITAL MEDIA ASSET LIBRARIES ON BEHALF OF A GROUP OF USERS

BACKGROUND

Google Drive, Dropbox, and Microsoft OneDrive are examples of online storage services. From a computer, smartphone, or other digital device that a user owns, the user can upload files to their account on an online storage service, by sending them through the Internet or another network to a server for the online storage service, which stores these files in a storage partition dedicated to the user and their account. At a future time, on any of the user's devices, the user can access these uploaded files.

For example, for digital songs that the user has purchased and stored on a particular laptop computer, the user can upload each to their account with an online storage service. Going forward, the user can log in to that account from any device, to be able to take actions such as listing the songs; downloading selected songs; or streaming selected songs for present playback. The user may similarly use the online storage service with respect to files of other types, such as audio/video sequences like movies; games; photos; etc.

BRIEF DESCRIPTION OF THE DRAWINGS

FIG. 4 is a storage diagram showing contents of a sample complete media asset stored on a first user's client.

FIG. 6 is a storage diagram showing a normalized media asset produced by the facility from original media asset 400 shown in FIG. 4.

FIG. 7 is a storage diagram showing a second original media asset representing the same media sequence as original media asset 400 shown in FIG. 4, despite having a different organization and total contents.

DETAILED DESCRIPTION

Figure 1:
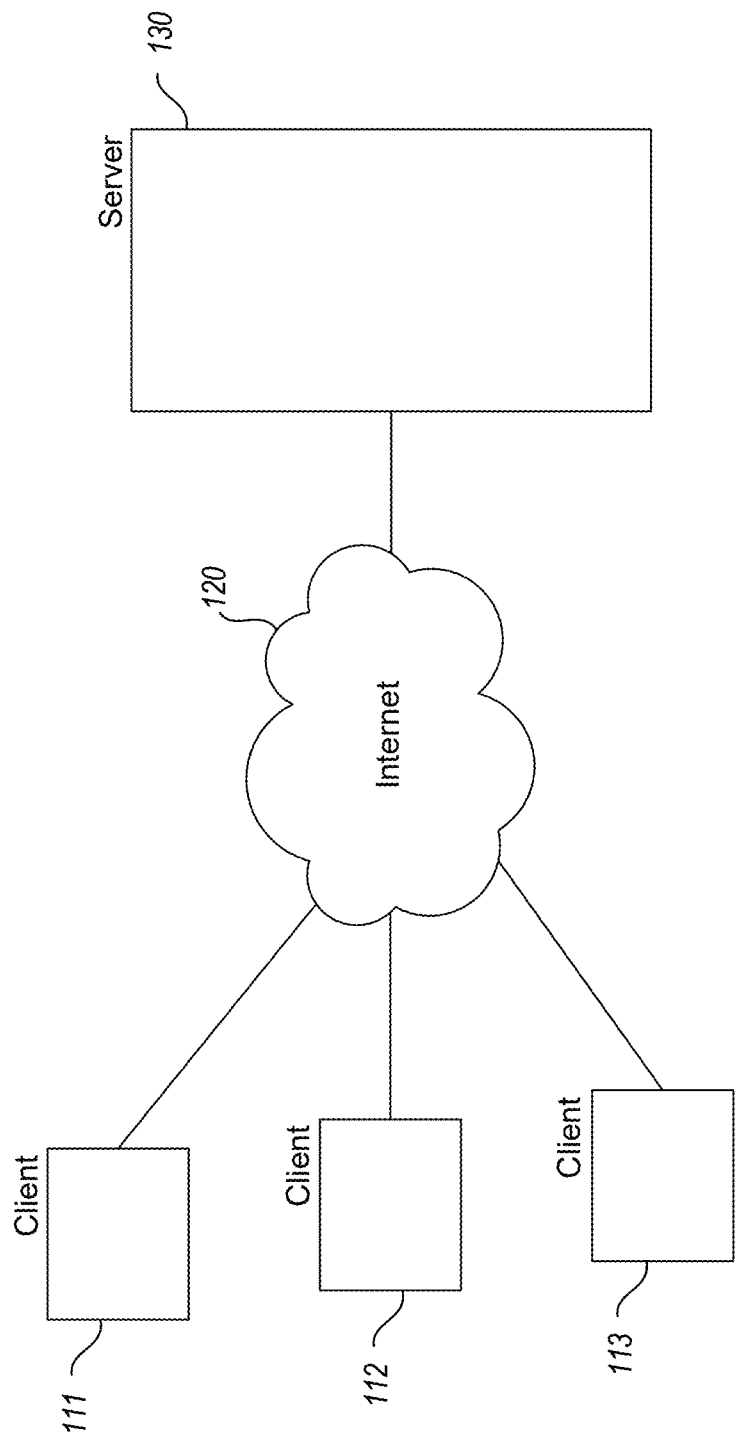
FIG. 1 is a network diagram showing an environment in which the facility operates in some embodiments.

The inventor has recognized that, while users use online storage services like those described above to store and manage their digital media collections—including assets of types such as music, podcasts, movies and other videos, etc.—there are significant ways in which these services are ill-suited to this use.

A first disadvantage recognized by the inventor involves inefficient use of server space: where the same song or other media asset is stored by each of multiple users, the online storage service maintains a separate copy of the media asset for each of these users, incurring a storage space cost similar to multiplying the size of the media asset by the number of users who store it.

A second disadvantage recognized by the inventor involves inefficient use of data communication bandwidth: for a media asset stored by multiple users, each copy of the media asset separately stored by the online storage service must be separately uploaded to the online storage's service, incurring a bandwidth cost similar to multiplying the size of the media asset by the number of users who store it.

In response to these recognitions, the inventor has conceived and reduced to practice a software and/or hardware facility for efficiently managing the storage of digital media asset libraries on behalf of a group of users ("the facility").

The facility operates in a client-server environment, in which each user uses one or more "client" computers, smartphones, or other computing devices. A user executes a client facility software module on their client, which can perform the following operations: ingesting a digital media asset ("asset") stored on the client device into the library maintained for the user by the facility; streaming for playback on the client device an asset in the user's library; downloading to the client device an asset in the user's library; and deleting from the user's library an asset maintained there.

In some embodiments, the facility performs the ingestion operation by determining whether the facility is already storing on the server an equivalent to the asset to be ingested. The facility does this by (1) on the client, (a) normalizing the asset to remove its metadata and blank regions, and ordering the remaining portions in a consistent way, and (b) computing a hash of the resulting normalized asset; and (2) on the server, determining whether a normalized asset having the same hash has already been uploaded and is presently stored. If not, the server instructs the client to upload a complete copy of the normalized asset, as well as the removed metadata, both of which it stores on the server, and to which it adds a reference to the user's library. If so, the server instructs the client to upload a particular range of the contents of the normalized asset to verify the user's possession of the normalized asset, as well as the metadata; if the uploaded range of contents matches, the server adds to the user's library references to the already-stored normalized asset, and the user's uploaded metadata.

In various embodiments, the facility uses various approaches to determining when to delete a normalized asset from the server. In some "synchronous" embodiments, the facility maintains a reference count for each asset, which it updates each time a user adds the asset to or deletes the asset from their library; when the reference count reaches zero, the server deletes the asset. In some "asynchronous" embodiments, the facility performs a periodic garbage collection operation in which, for each stored asset, it searches for a user library that contains the asset, and deletes the asset only if no user library is found that contains it. In various embodiments, rather than immediately deleting an asset found by one of the above approaches to be in no user's library, the facility schedules the asset for deletion at a later time if it has not by then been added to a user's library, and/or moves it to a less immediately accessible, less expensive storage area.

In some embodiments, the facility obtains normalized assets provided from a source other than the facility's users, such as publishers or distributors of the assets, such as by preloading these, or by retrieving them on demand in response to the first user add request received for each.

In some embodiments, the facility normalizes individual portions of a media asset—such as video, audio, and caption portions—rather the entire payload of the media asset, enabling them to be managed separately by the facility, and differentially uploaded to the server.

By operating in some or all of the ways described above, the facility conserves most of the bandwidth that would have been used to upload media assets that are equivalent to an asset already stored by the facility. Similarly, the facility conserves most of the storage space on the server that would have been occupied by assets equivalent to ones already stored. Such capacity conservation constitutes improving the functioning of computer or other hardware. Also, the facility's hashing, transmitting, and storing the large volumes of data that make up typical media assets prevents its actions from being mental processes that can be practically performed in the human mind.

The facility also enables a user to maintain and revise personalized metadata for an asset that does not match the metadata stored for other users having that asset in their libraries. The facility is further resistant to attempts by a user to add to their library an asset they do not possess.

FIG. 1 is a network diagram showing an environment in which the facility operates in some embodiments. Client computing systems 111-113 are each used by a user of the facility to maintain and access their digital media asset libraries. The clients are connected via the Internet 120 or another network to a server 130 responsible for maintaining the digital media asset libraries for all of the users. In some embodiments, the facility includes software that executes on the client computing devices, as well as additional software that executes on the server.

Figure 2:
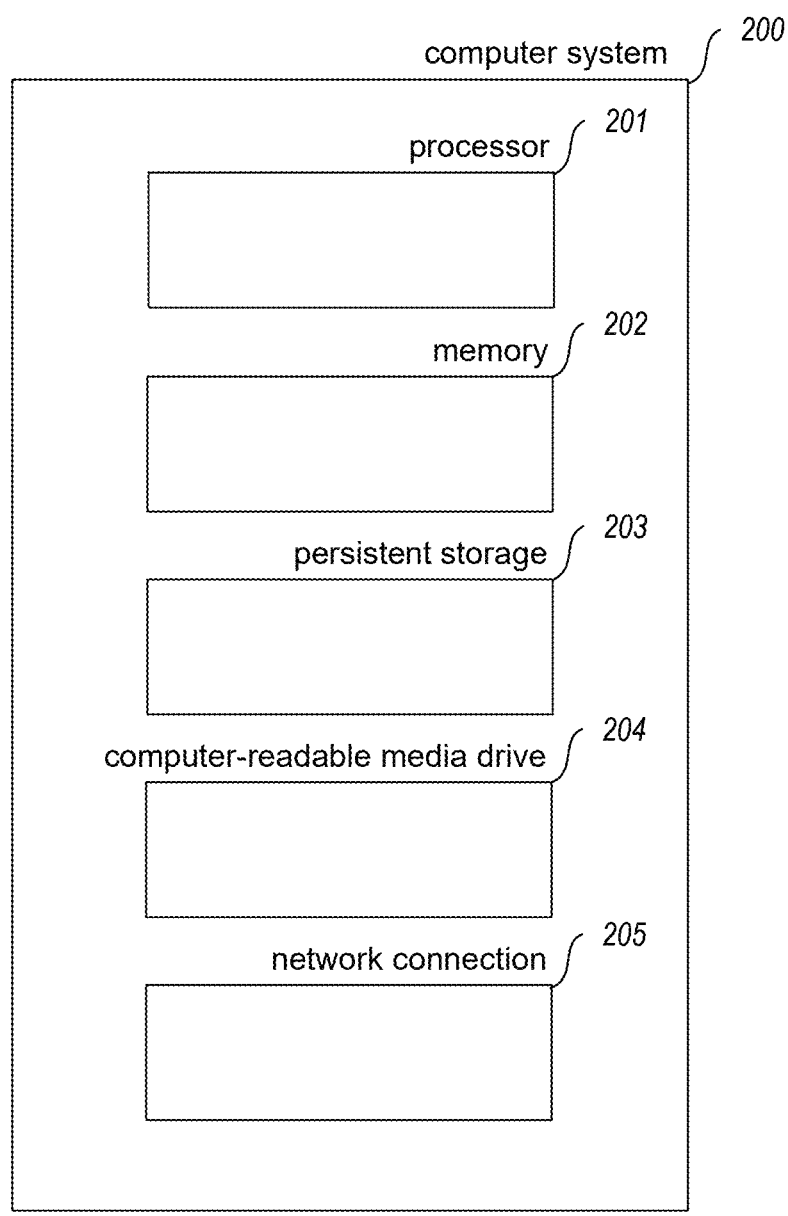
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include one or more server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202—such as RAM, SDRAM, ROM, PROM, etc.—for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

Figure 3:
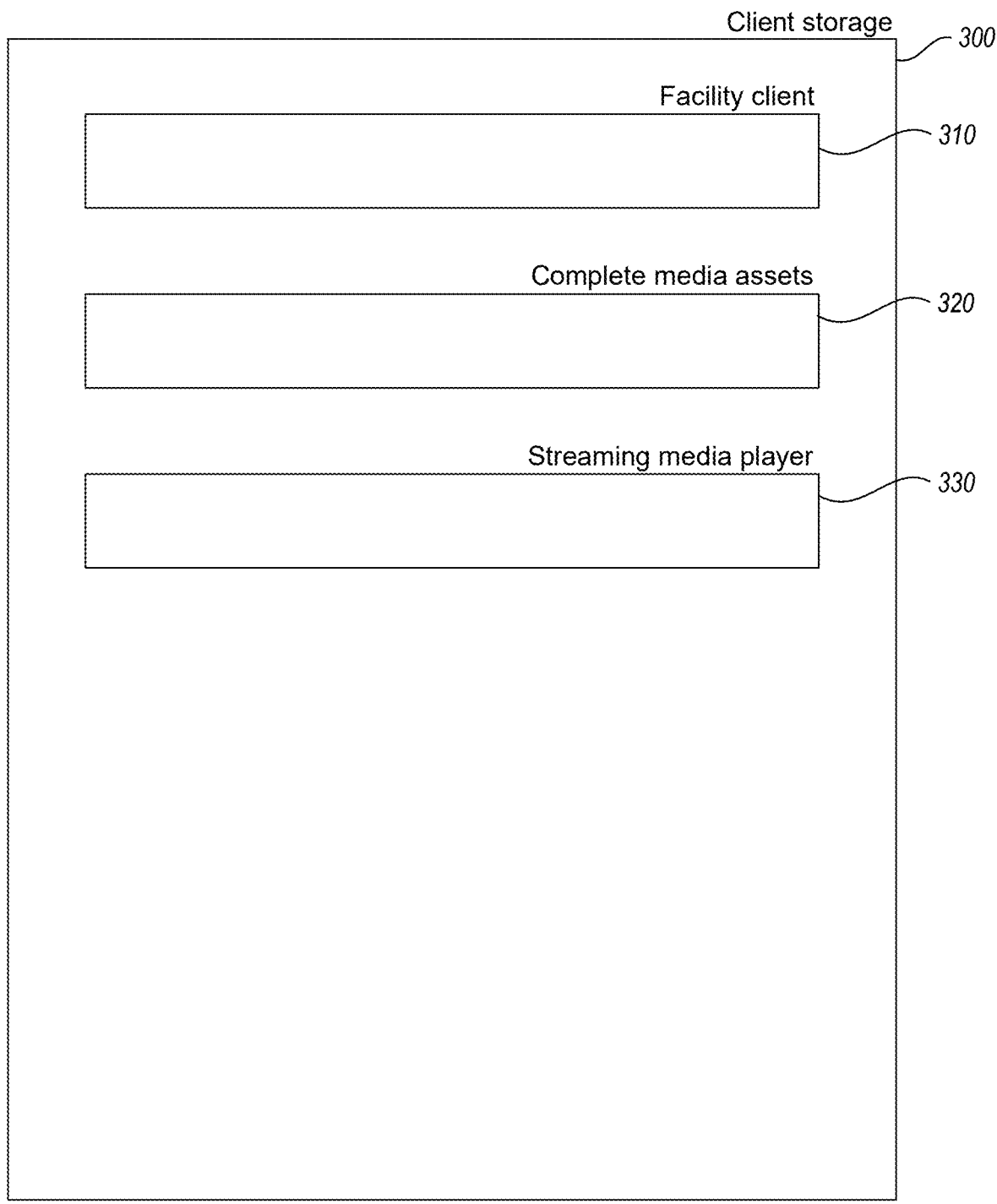
FIG. 3 is a storage diagram showing sample contents of storage on a particular user's client storage device.

FIG. 3 is a storage diagram showing sample contents of storage on a particular user's client storage device. It shows client storage 300 containing code 310 for the facility that executes on the client, as well as a set of complete media assets 320 in a form in which they can be played, including both substantive media data and metadata describing the media asset. In various embodiments, the user obtains these complete media assets in a variety of ways from a variety of sources, such as by purchasing them from their producers, distributors, or other paid sources; downloading them from sources that distribute them for free; creating them or assembling them themselves; etc. In some embodiments, the complete media assets 320 include one or more assets that are included in the user's media library and have been downloaded from the server. The client storage also contains code 330 for a streaming media player that is capable both of playing complete media assets stored on the client, and media assets streamed from steaming sources that include the server.

While FIG. 3 and each of the storage diagrams discussed below show data whose contents and organization are designed to make them more comprehensible by a human reader, those skilled in the art will appreciate that actual data structures used by the facility to store this information may differ from those shown, in that they, for example, may be organized in a different manner; may contain more or less information than shown; may be compressed, encrypted, and/or indexed; may be grouped in different ways than shown, etc. Additionally, in various embodiments, the data is stored in a variety of forms, such as table; semi-5 structured or unstructured data stores, such as JSON objects; etc.

FIG. 4 is a storage diagram showing contents of a sample complete media asset stored on a first user's client. The media asset 400 is shown as a tree data structure. The tree 400 is made up of nodes of a number of different types described below in Table 1.

TABLE 1

| Node Type | Description |
|---|---|
| FTYP | The root node, "magic number", spec version, other qualifications on the file format. |
| FREE | An unused block which allows adjacent nodes to grow/shrink in place without causing cascading recalculation of offset tables (such as STCO below) |
| MOAT | "Media data" in the file, encoded audio and video samples. This is the main payload. |

TABLE 1-continued

| Node Type | Description |
| --- | --- |
| MOOV | The root of the "metadata" region of the file, conventionally called the "movie box", "movie node", or "movie atom". |
| MVHO | "Movie header", contains the total duration (running time) of the media content, creation and modification time, and a few other such fields. |
| TRAK | Contains meta data about a single "track". The mpeg format can contain many concurrent or sequential tracks. For example, we could have a video track and multiple alternate audio tracks which are meant to run in parallel. The TRAK node does not contain the media data itself, but information about how it is encoded and where the related samples are located. |
| MOIA | "Media", the section of TRAK that relates to the media samples. |
| MINF | "Media information", an aggregating node under MOIA. |
| STBL | "Sample table", a container node for sample chunks. |
| STCO | "Sample table chunk offsets"—an array of offsets relative to the start of the file for a "chunk" of samples that all belong to one TRAK. |
| UOTA | "User data", the root of the subtree which contains metadata for the asset: artist, album, track number, disc number, and related images such as album artwork or thumbnails. |

In some embodiments, the facility supports media assets in one or more media formats. The node types shown in Table 1 and FIGS. 4, 6, and 7 and their relative organization reflect the media format defined by the MPEG-4 standard, discussed in the following documents, each of which is incorporated by reference in its entirety: go mp4 decoder, available at github.com/mshafiee/mp4; rust mp4 metadata decoder, available at docs.rs/mp4ameta/0.11.0/mp4ameta/; format overview powerpoint from the mpeg4 working group, available at www.mpeg.org/wp-content/uploads/whitepapers/files/MPEG-4/Part_12/w18093_0.zip; Apple QuickTime docs, available at developer.apple.com/documentation/quicktime-file-format. In cases where a document incorporated herein by reference conflicts with the present disclosure, the present disclosure controls.

In some embodiments, the facility also or instead supports media assets in one or more of the following additional formats: MP3, described at id3.org/Developer%20Information; Ogg Vorbis, described at xiph.org/vorbis/doc/Vorbis_I_spec.html; FLAC, described at xiph.org/flac/documentation_format_overview.html; AIFF/WAV, described at en.wikipedia.org/wiki/Interchange_File_Format; and WMV/ASF, described at web.archive.org/web/20140419205228/http://msdn.microsoft.com/en-us/library/bb643323.aspx. Each of the foregoing documents is hereby incorporated by reference in its entirety.

In the tree 400, it can be seen that: node 410 is the root node; node 430 contains the substantive media data, reflecting the media content of the asset; nodes 440-464 contain data needed to access, navigate, and render the substantive media data contained in node 430, including the "STCO1" node containing offsets based on the organization of tree 400; node 470 contains a first version ("UDTA1") of metadata for the multimedia asset; and node 420 contains free space included to facilitate further future alignment of the contents of the asset based upon possible changes to it.

Figure 5A:
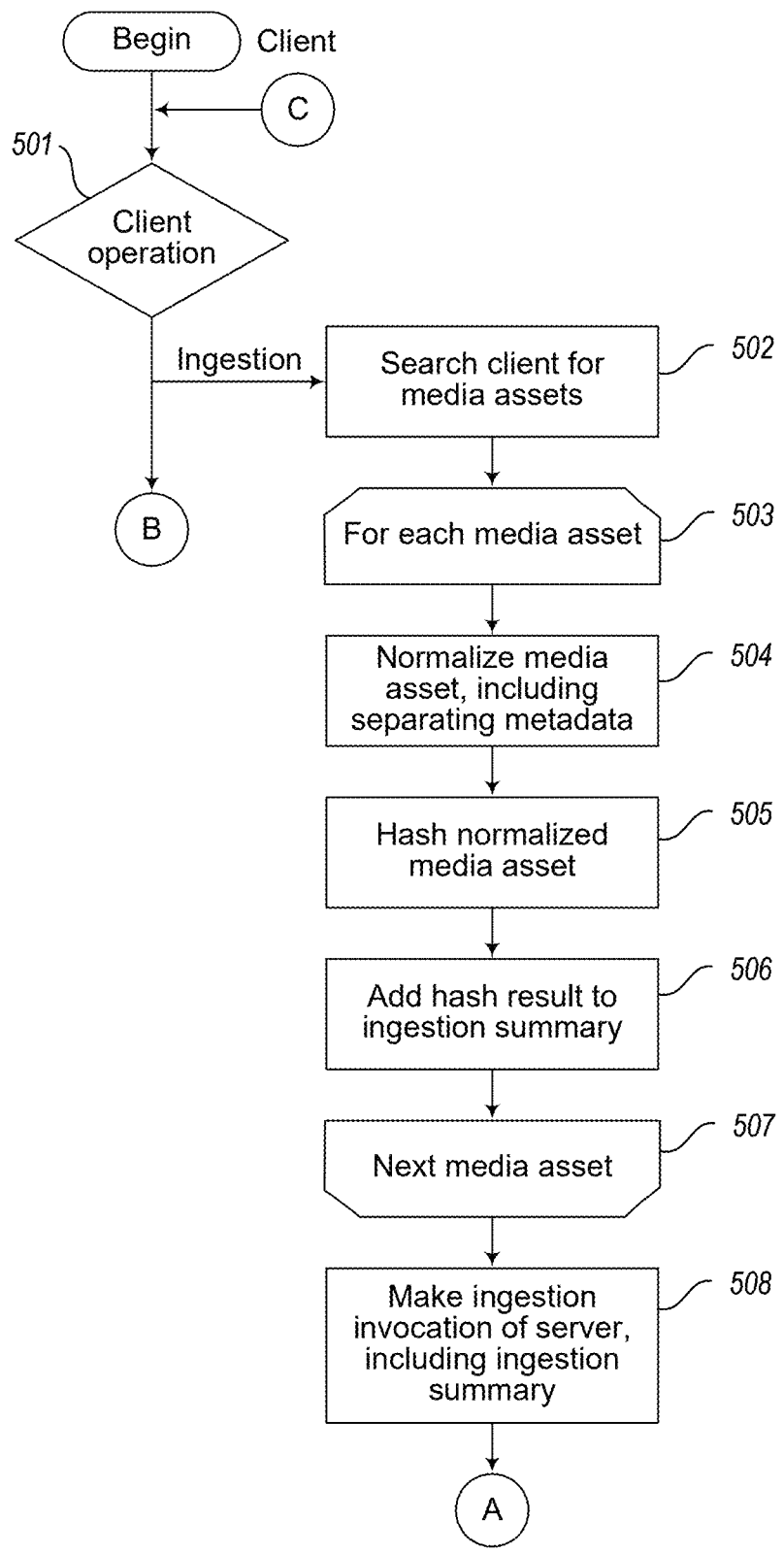
FIGS. 5A-5C are flow diagrams showing a process performed by the facility in some embodiments to operate on one of the client computing systems.
Figure 5B:
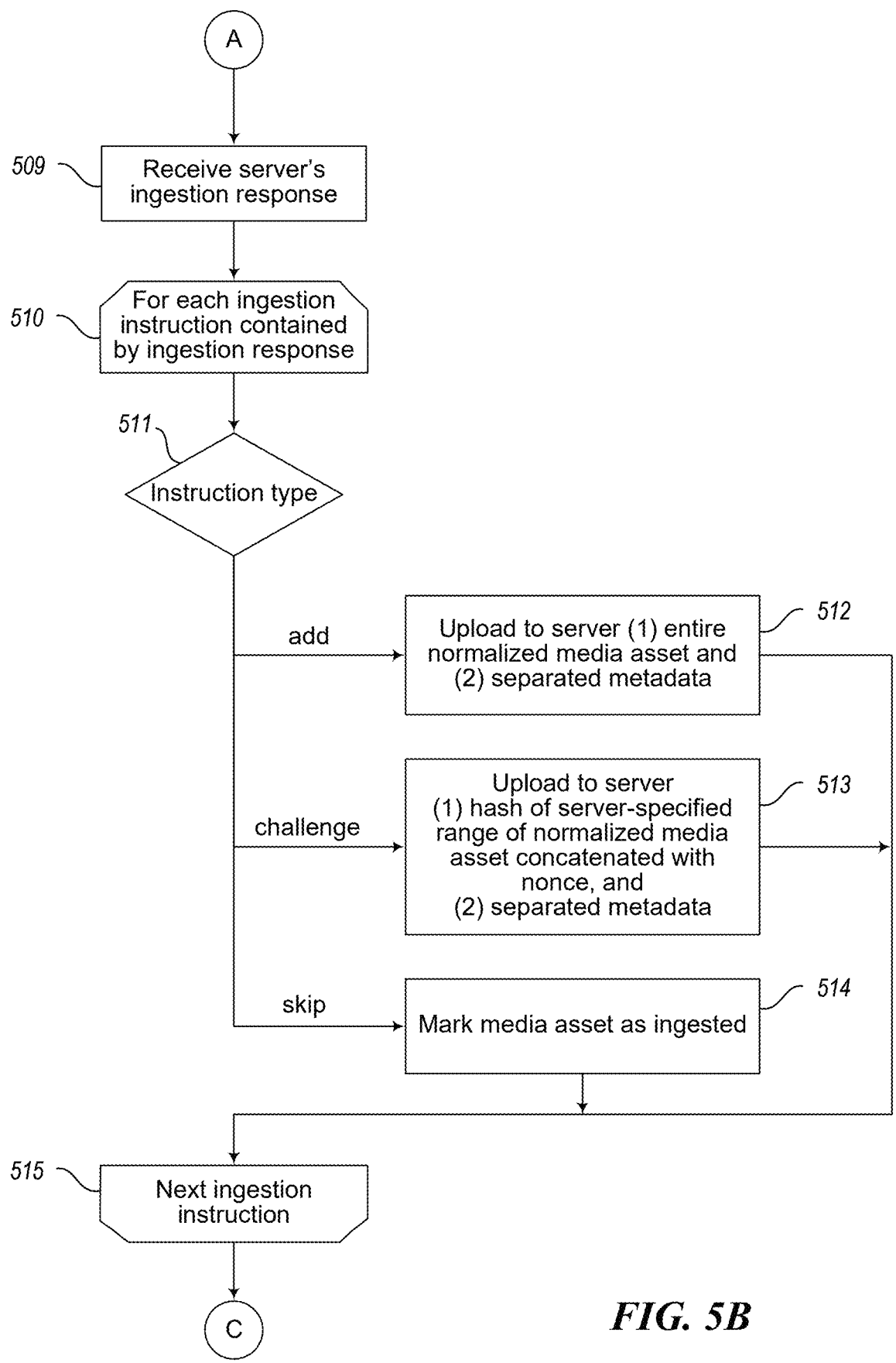
Figure 5C:
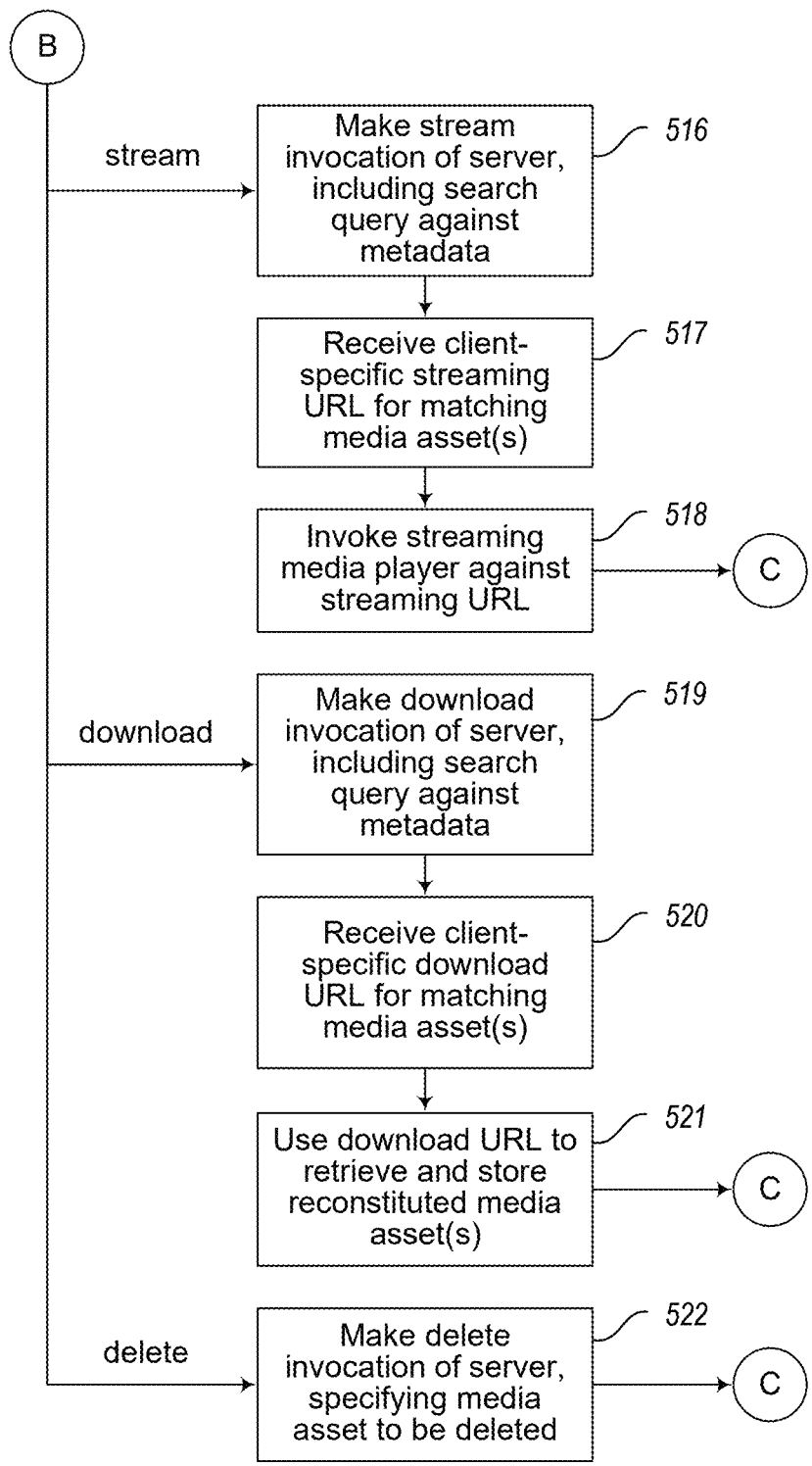

FIGS. 5A-5C are flow diagrams showing a process performed by the facility in some embodiments to operate on one of the client computing systems. In act 501, the facility branches on a type of client operation to be performed. In various embodiments, the client operations are initiated automatically—such as periodically—and/or in response to explicit commands from the user, such as a via a visual user interface, a command line, interactions with a media player, etc. Where the client operation type is ingesting one or more original media artifacts into the user's library, the facility continues in act 502; where the operation type is streaming a multimedia asset that is in the client's library, the facility continues in act 516; where the operation type is downloading a media asset from the user's library to the client device, the facility continues in act 519; and when the operation type is deleting a multimedia asset from the user's library, the facility continues in act 522.

In act 502, where the operation is an ingestion operation, the facility searches the client device for media assets. In some embodiments, the search for media assets is qualified to discover only media assets not marked as ingested. In acts 503-507, the facility loops through each media asset discovered in act 502. In act 504, the facility normalizes the media asset. Normalization includes separating asset metadata from the contents of the asset; removing free nodes or blocks of space; sorting the remaining contents into a standard order; and updating internal reference positions ("offsets") to reflect the movement of the referred-to points in the asset as reorganized. In some embodiments, the facility performs some or all of this normalization using one or more format-specific transcoders selected automatically based on the format(s) and/or type(s) of the asset. This normalization is shown and discussed below for the sample original media asset shown in FIG. 4.

FIG. 6 is a storage diagram showing a normalized media asset produced by the facility from original media asset 400 shown in FIG. 4. The normalized media asset is shown as a tree 600. By comparing normalized media asset 600 to original media asset 400, it can be seen that: free space node 420 has been eliminated, and asset metadata node 470 has been removed; node 440 and its subtree for accessing the media content data has been moved as node 640 and its subtree into a new position relative to media content data node 630, corresponding to node 430 in the original media asset; and offset node 464 has been rewritten from STCO1 to STCO' in node 764 to update the references therein.

The purpose of the facility's media assets normalization is to overcome the (1) polymorphism and (2) possibly differing asset metadata of multiple different original media assets all representing and embodying the same substantive media sequence. This allows such polymorphic versions of the same media sequence—with possibly differing asset metadata—to be represented commonly in the server, the saving storage capacity on the server and communications capacity to the server.

FIG. 7 is a storage diagram showing a second original media asset representing the same media sequence as original media asset 400 shown in FIG. 4, despite having a different organization and total contents. This second original media asset 700, however, despite being different from the first original media asset 400, nonetheless is normalized by the facility to the same normalized media asset 600. While the free node 720 in original media asset 700 is in a different position than the free node 420 in original media asset 400, it is nonetheless deleted. While the media asset metadata node 770 has different contents (UDTA2) than the media asset metadata node 470 in original media asset 400 and is in a different position, it is nonetheless removed; and, in the case of normalization of original media asset 700 to normalized media asset 600, the relative order of the node 740 and its subtree compared to node 730 ends up being unaltered in normalized media asset 600.

Returning to FIG. 5A, in act 505, the facility determines a hashed representation of the normalized media asset obtained in act 504, such as by using a hash algorithm like SHA256. In act 506, the facility adds the hash result obtained in act 505 to an ingestion summary to be sent to the server in an ingestion invocation. In act 507, if additional discovered media assets remain to be processed, the facility continues in act 503 to process the next discovered media asset. In act 508, the facility makes an ingestion invocation of the server, including the ingestion summary accumulated over iterations of act 506. The server's handling of this ingestion invocation is described below in connection with FIG. 8. After act 508, the facility continues through connector A to act 509 shown in FIG. 5B.

Figure 8:
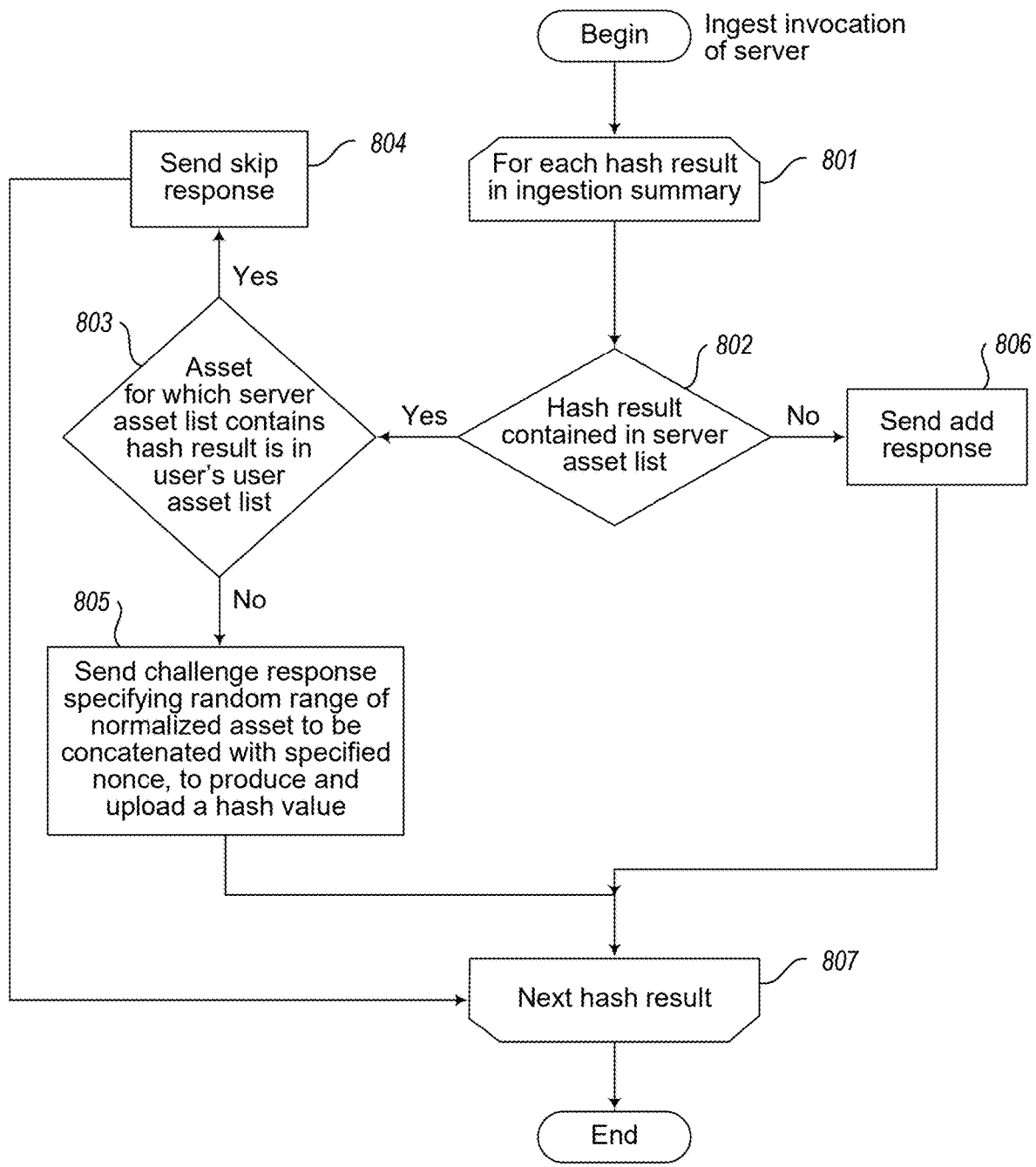
FIG. 8 is a flow diagram showing a process performed by the facility in some embodiments to handle an ingestion invocation of its server.

FIG. 8 is a flow diagram showing a process performed by the facility in some embodiments to handle an ingestion invocation of its server. In acts 801-807, the facility loops through each of one or more hash results contained by the ingestion summary for the media assets to be ingested. In act 802, if the hash result is contained in a list of server assets maintained by the server for the normalized media assets stored in the server, then the facility continues in act 803, else the facility continues in 806.

Figure 9:
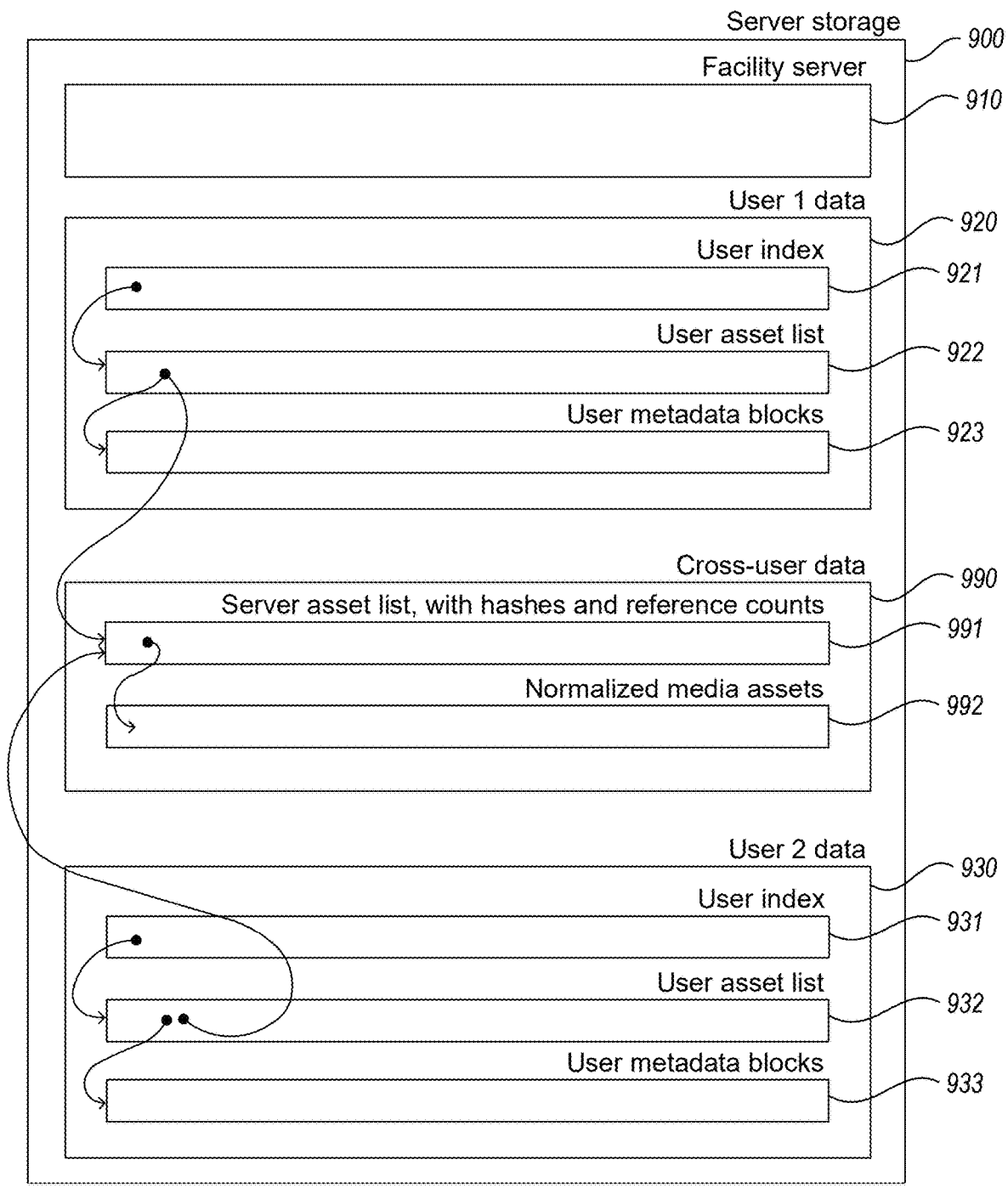
FIG. 9 is a storage diagram showing sample contents of storage on the facility's server.

FIG. 9 is a storage diagram showing sample contents of storage on the facility's server. The server storage 900 includes code 910 for a portion of the facility that executes on the server. It also contains user-specific data for each user of the facility, including data 920 for user 1 and data 930 for user 2. The user 1 data includes user 1's metadata blocks 923 for each of the media assets that user 1 has added to their media library. A user asset list 922 for user 1 lists the assets that the user has added to their media library; for each such asset, the asset list contains a pointer (such as a unique identifier) to the asset's metadata block among user metadata blocks 923, as well as a pointer to the normalized asset's entry in a server asset list 991 maintained by the facility in a body of data 990 that crosses all of the facility's users. For each asset in the server asset list, the facility maintains a pointer to the content of the corresponding normalized media asset among all of the normalized media assets 992 stored on the server by the facility. Returning to the user 1 data, it also includes a user index 921 that maps from different search key words—such as terms among the asset metadata—to matching media assets in user 1's user asset list. User 2 data 930, as well as user data for additional users, parallels the contents discussed for user 1 data 920. In particular, the arrows show that both user 1's library and user 2's library contain the same normalized media asset, such as normalized media asset 600 shown in FIG. 6. Despite these two users having different polymorphic original representations of this normalized media asset—as well as potentially different asset metadata—the content of this media asset is represented for both users in a single file stored among the normalized media assets 992 on the server. Returning to FIG. 8, in act 803 where the current hash result from the ingestion summary is contained in the server asset list 991, if this asset is in the user asset list of the user on whose behalf the ingest invocation was made, then the facility continues in act 804, else the facility continues in act 805. In act 804, the facility sends a skip response to the client with respect to the current hash results in the ingestion summary, instructing the client that no further action should be taken with respect to this media asset, since it has already been successfully ingested on behalf of the user. After act 804, the facility continues in act 807.

In act 805, where the normalized media asset is being stored by the server but is not yet in the ingesting user's library, the facility sends a challenge response to the client with respect to the hash result in the ingestion summary specifying a random range of the normalized asset for the client to upload to the server to confirm that a valid version of the normalized is stored on the client.

In some embodiments, in act 805 (not shown), the facility temporarily increases the reference count it maintains for the asset for a period of time, such as twenty seconds, to prevent the asset from being removed in the middle of the ingestion process. At the end of this period, the reference count is automatically decremented. After act 805, the facility continues in act 807.

In act 806, where the current hash result in the ingestion summary is not contained in the server asset list—and thus the corresponding normalized asset is not stored by the server, the facility sends an add response to the client, instructing it to upload the entire normalized media asset, as well as the ingesting user's asset metadata for it. After act 806, the facility continues in act 807. In act 807, if additional hash results remain in the ingestion summary to be processed, then the facility continues in act 801 to process the next has result, else this process concludes.

Those skilled in the art will appreciate that the acts shown in FIG. 8 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Returning to FIG. 5B, in act 509, the facility in the client receives the server's ingestion response in accordance with act 804, 805 or 806 for each of the hash results in the ingestion summary submitted with the ingest invocation. In acts 510-515, the facility loops through the ingestion instructions contained by the ingestion response for each of the hash results. In act 511, the facility branches on the instruction type of the current ingestion instruction: if the instruction is an add instruction, then the facility continues in act 512; if the instruction is a challenge instruction, then the facility continues in act 513; if the instruction is a skip instruction, then the facility continues in act 514. In act 512, the facility uploads to the server the entire normalized media asset, as well as the user's metadata that was earlier separated from the original media asset. When the server receives this information, it adds the entire normalized media asset to the normalized media assets 992 stored on the server; adds an item to the server asset list 991 for the normalized media asset; adds an item to the user asset list 922 pointing to the new item in the server asset list for the normalized media asset; adds the user's asset metadata block to the user's user metadata block 923; and augments the user index 921 to map from metadata among the user's metadata block to the item added to the user asset list. After act 512, the facility continues in act 515.

In act 513, where the instruction is a challenge instruction, the facility uploads to the server the range of the normalized media asset stored on the client that was specified by the server in the ingestion response, as well as the asset metadata separated from the original media asset. In response to receiving this information, the facility tests to make sure that the uploaded range of the normalized media asset matches the same range in the copy of the normalized media asset that it is storing among normalized media assets 992. If this is true, then the facility augments the user 1 user metadata blocks, user asset list, and user index as described above with respect to the add instruction. After act 513, the facility continues in act 515.

In act 514, where the instruction is a skip instruction, the facility marks the media asset as ingested, so it will not be selected in a future search for uningested media assets. After act 514, the facility continues in act 515. In act 515, if another ingestion instruction contained by the ingestion response remains for processing, the facility continues in act 510 to process the next ingestion instruction. After 515, the facility continues through connector C to act 501 shown in FIG. 5A to process the next client operation.

For client operations branched on in act 501 that are not ingestion operations, the facility continues through connector B to FIG. 5C. In act 516, where the client operation is a stream operation, the facility makes a stream invocation of the server, identifying the media asset to be streamed, such as via a query against asset metadata. The facility's handling of this stream invocation is discussed below in connection with FIG. 10.

Figure 10:
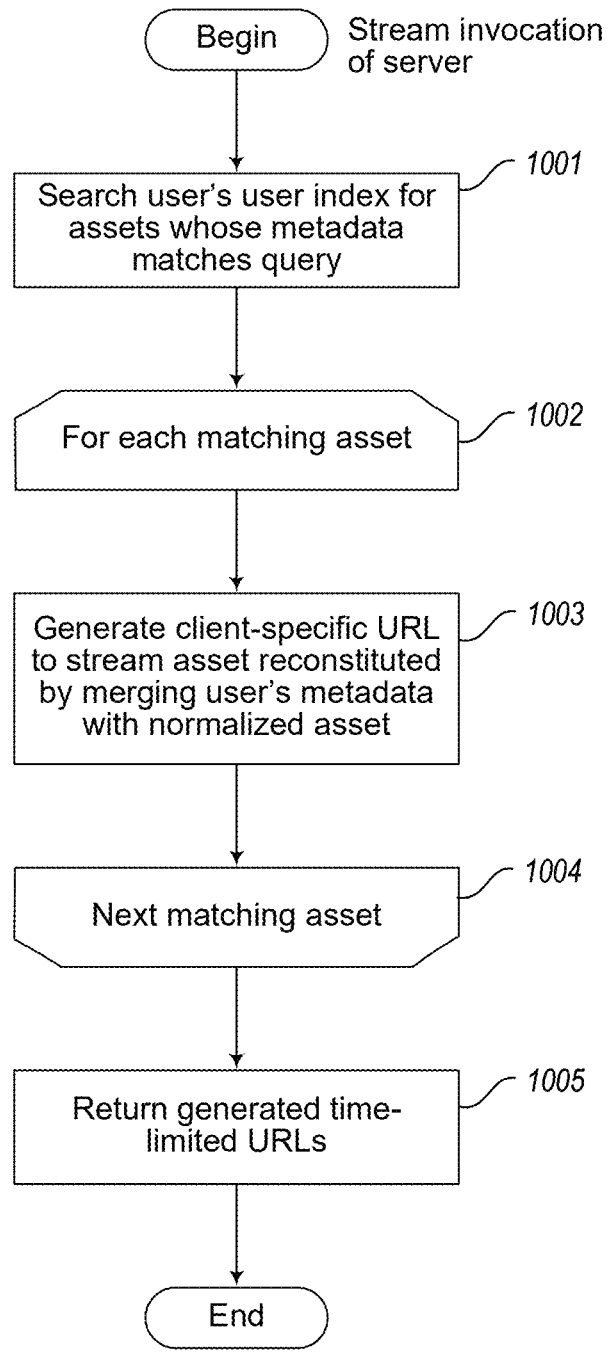
FIG. 10 is a flow diagram showing a process performed by the facility in some embodiments to handle a stream invocation of the server.

FIG. 10 is a flow diagram showing a process performed by the facility in some embodiments to handle a stream invocation of the server. In act 1001, the facility identifies in the invoking user's user asset list one or more media assets to be streamed, such as by applying the user index 921 to a metadata query included in the stream invocation. In acts 1002-1005, the facility loops through each asset identified in the user asset list. In act 1003, the facility generates a client-specific URL usable to stream a reconstituted version of the matching asset. In some embodiments, this client-specific URL is time-limited. In some embodiments, when the client uses this URL to make a request to stream the asset, the facility performs a reconstitution process for the matching asset by merging the user's metadata for the matching asset—stored among user metadata blocks 923 for the invoking user—with the normalized asset—stored among normalized media assets 992 for all users of the facility. In act 1004, if additional matching assets remain to be processed, then the facility continues in act 1002 to process the next matching asset. In act 1005, the facility returns the generated time-limited URLs to the client in response to the invocation. After act 1005, this process concludes.

Returning to FIG. 5C, in act 517, the facility receives from the server the time-limited streaming URL for any matching media assets. In act 518, the facility calls the streaming media player against the streaming URLs received in act 517. After act 518, the facility continues through connector C in act 501.

In act 519, where the client operation is a download operation, the facility makes a download invocation of the server, identifying the media asset to be downloaded, such as via a query against asset metadata. The server's processing of this download is described below in connection with FIG. 11.

Figure 11:
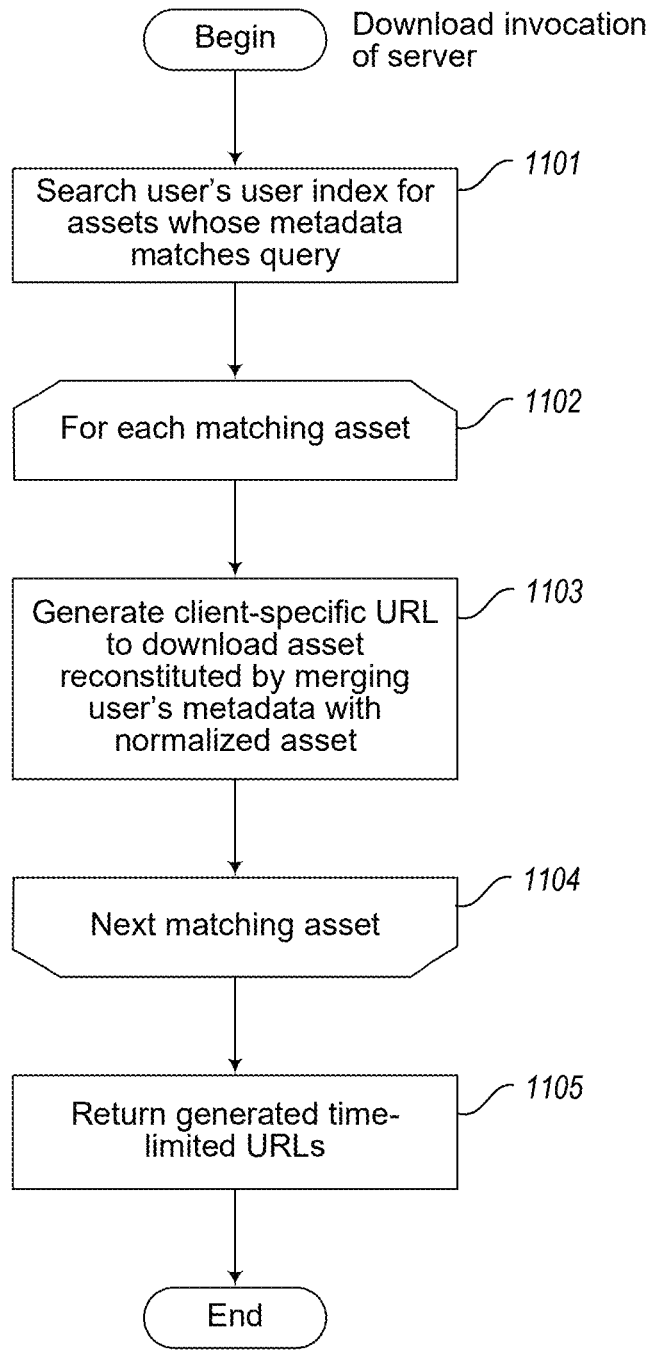
FIG. 11 is a flow diagram showing a process performed by the facility in some embodiments to process a download invocation of the server.

FIG. 11 is a flow diagram showing a process performed by the facility in some embodiments to process a download invocation of the server. By comparing FIG. 11 to FIG. 10, it can be seen that the process shown in FIG. 11 is similar to the process shown in FIG. 10 and differs in that the client-specific URL generated in act 1103 is one to download rather than stream the reconstituted asset.

Returning to FIG. 5C, in act 520 the facility receives from the server the time-limited download URL for any matching media assets. In act 521, in some embodiments, the facility calls the media player against the download URLs received in act 520. After act 521, the facility continues through connector C to act 501 in FIG. 5A to process the next client operation.

In act 522, where the client operation is a delete operation, the facility makes a delete invocation of the server specifying a media asset to be deleted, such as via its hash value or a query against metadata. The facility's processing of the delete invocation of the server is discussed below in connection with FIG. 12.

Figure 12:
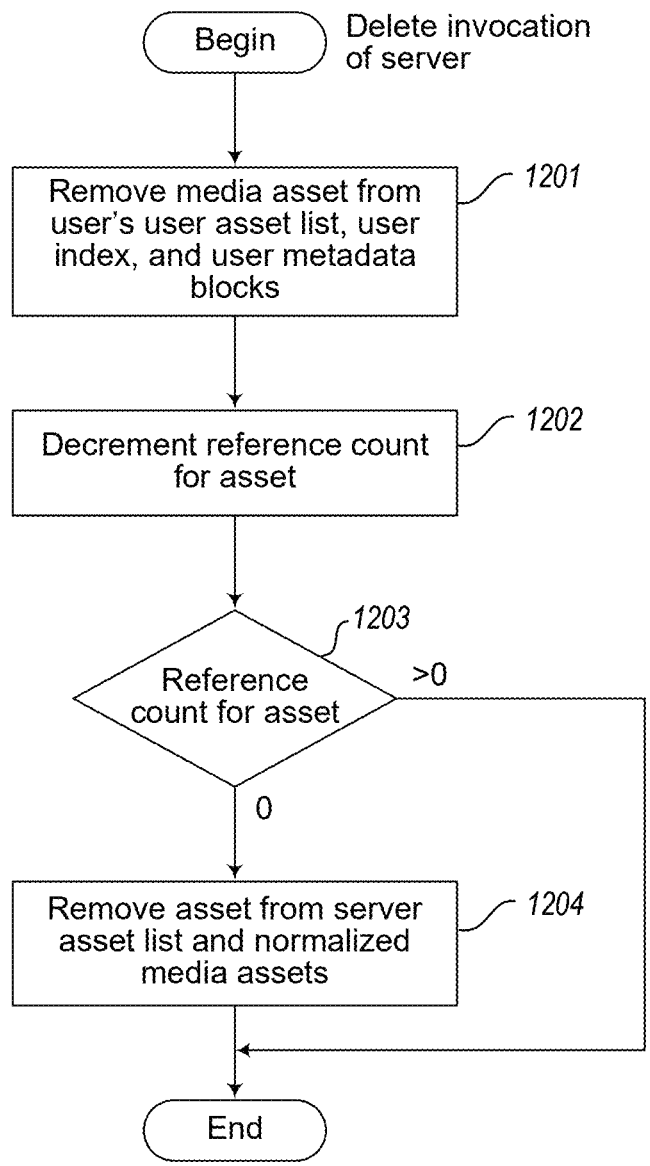
FIG. 12 is a flow diagram showing a process performed by the facility in some embodiments to process a delete invocation of the server by the client.

FIG. 12 is a flow diagram showing a process performed by the facility in some embodiments to process a delete invocation of the server by the client. In act 1201, the facility removes the media assets specified by the delete invocation from the user's user asset list, user index, and user metadata blocks. In act 1202, the facility decrements a reference count for the asset documenting the number of users who have the asset in their library. In act 1203, if the reference count for the asset is 0, then the facility continues in act 1204, else the process completes. In act 1204, the facility removes the asset from the server asset list and the normalized media assets. In some embodiments, rather than immediately deleting the asset in act 1204, the facility sets a deletion timer for a time on the future, against the possibility that a user will soon seek to ingest the asset. In some embodiments, as part of act 1204 (not shown), the facility checks to make sure it is not in the process of adding the asset for a user before performing the removal of act 1204, and aborts the removal if it is.

In some embodiments, as discussed above, rather than synchronistically maintaining a reference count for the asset that is used by the facility to determine whether to remove the asset from the server asset list and normalized media assets, the facility periodically performs an asynchronous garbage collection operation where it searches for normalized media assets stored by the server that are not on any user's user asset list.

After act 522, the facility continues through connector C to act 501 in FIG. 5A to process the next client operation.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more memories collectively having contents configured to cause a server to perform a method, the method comprising:
   receiving from a first client device that is remote from the server and being used by a first user a first hash value determined by applying a hash function to a normalized first media asset derived from a first original media asset stored on the first client;
   determining whether the received first hash value is among a plurality of hash values each of a normalized media asset stored on the server;
   in response to identifying one of the plurality of hash values that matches the received first hash value, transmitting to the first client device a challenge specifying a subrange of positions within the normalized first media asset to which the matching hash value corresponds;
   receiving from the first client device, in response to the challenge, (a) a representation of contents of the normalized first media asset at the sub-range of positions specified by the challenge, and (b) metadata extracted from the first original media asset;
   determining whether the received contents of the normalized first media asset match the stored normalized media asset to which the matching hash value corresponds;
   in response to determining that the received representation of contents of the normalized first media asset match the stored normalized media asset to which the matching hash value corresponds:
      storing on behalf of the first user the metadata received from the first client device, in connection with the stored normalized media asset to which the matching hash value corresponds, the received metadata; and
      storing an indication that the first user is authorized to access a media asset equivalent to the first original media asset that is reconstituted from (a) the stored normalized media asset to which the matching hash value corresponds and (b) the stored metadata received from the first client.

2. The one or more memories of claim 1 wherein the first original media asset comprises an audio sequence or an audio/video sequence.

3. The one or more memories of claim 1 wherein the challenge further specifies a randomly-generated nonce, and wherein determining that the received representation of contents of the normalized first media asset match the stored normalized media asset to which the matching hash value corresponds comprises:
   concatenating the nonce with the specified sub-range of the stored normalized media assets;
   hashing the result of the concatenation; and
   comparing the hashing result of the concatenation with the representation.

4. The one or more memories of claim 1, the method further comprising:
   at a time before the occurrence of either of the determining acts:
      receiving from a second client device that is remote from the server and being used by a second user the first hash value, determined by applying a hash function to the normalized first media asset derived from a second original media asset stored on the second client device, the second original media asset differing from the first original media asset;
      determining whether the received hash value is among a plurality of hash values each of a normalized media asset stored on the server;
      in response to determining that the received hash value is not among the plurality of hash values each of a normalized media asset stored on the server, transmitting to the second client device a request to upload the normalized first media asset;
      receiving from the second client device, in response to the request, (a) full contents of the normalized first media asset, and (b) metadata extracted from the second original media asset;
      storing the received normalized first media asset;
      adding the received hash value to the plurality of hash values;
      storing on behalf of the second user the metadata received from the second client device, in connection with the stored normalized first media asset; and
      storing an indication that the second user is authorized to access a media asset equivalent to the second original media asset that is reconstituted from (a) the stored received normalized media asset and (b) the stored metadata received from the second client.

5. The one or more memories of claim 1, the method further comprising:
   at a time before the occurrence of either of the determining acts:
      receiving from a provider computer remote from the server and separate from the first client device a plurality of original media assets;
      for each received original media asset:
         removing metadata, and
         after the removing, reordering the contents of the original media asset that remain after removing the metadata to conform their order to a predetermined order,
         determining a hash value for the normalized media asset,
         adding the normalized media asset to the normalized media assets stored on the server, and
         adding the determined hash value to the plurality of hash values.

6. The one or more memories of claim 1, the method further comprising, for each of at least a portion of the received original media assets:
   updating at least one reference within the original media asset to reflect the removing and the reordering to produce a normalized media asset,
and wherein the hash value is determined after the updating.

7. The one or more memories of claim 1, the method further comprising:
   receiving from the first client device a request identifying the normalized first media asset;
   combining (a) the stored normalized media asset to which the matching hash value corresponds and (b) the stored metadata received from the first client device to reconstitute the first original media asset; and
   providing to the first client device a mechanism for accessing the reconstituted first original media asset.

8. The one or more memories of claim 1, the method further comprising:

in response to determining that the received contents of the normalized first media asset match the stored normalized media asset to which the matching hash value corresponds:
  incrementing a count of users who have added the first media asset to their libraries without subsequently removing it;
  at a time after storing the metadata and storing the indication, receiving from the first client device a request to remove the first media asset from the first user's library; and
  directly in response to receiving the request:
    deleting the stored metadata,
    deleting the stored indication,
    decrementing the count of users who have added the first media asset to their libraries without subsequently removing it, and
    in response to determining that the decremented count is zero, deleting the stored normalized media asset to which the matching hash value corresponds.

9. The one or more memories of claim 1, the method further comprising:
  in response to determining that the received contents of the normalized first media asset match the stored normalized media asset to which the matching hash value corresponds:
    incrementing a count of users who have added the first media asset to their libraries without subsequently removing it;
  at a time after storing the metadata and storing the indication, receiving from the first client device a request to remove the first media asset from the first user's library;
  directly in response to receiving the request:
    deleting the stored metadata, and
    deleting the stored indication;
  at the time after deleting the stored metadata in the stored indication:
    for each of a plurality of normalized media assets stored on the server:
      determining whether for any users indications are stored that they are authorized to access a media asset equivalent to the normalized media asset;
      where it is determined that for no user is an indication stored that the user is authorized to access a media asset equivalent to the normalized media asset, deleting the normalized media asset,
  wherein the stored normalized media asset to which the matching hash value corresponds is deleted.

10. The one or more memories of claim 1, the method further comprising:
  receiving from a second client device that is remote from the server and being used by a second user a second hash value determined by applying a hash function to a normalized second media asset derived from a second original media asset stored on the second client device;
  determining whether the received second hash value is among a plurality of hash values each of a normalized media asset stored on the server;
  in response to identifying one of the plurality of hash values that matches the received second hash value, transmitting to the second client device a challenge specifying a subrange of positions within the normalized second media asset to which the matching second hash value corresponds;
  receiving from the second client device, in response to the challenge, (a) data that purports to be contents of the normalized second media asset at the sub-range of positions specified by the challenge, and (b) data purporting to be metadata extracted from the second original media asset;
  determining whether the received data that purports to be contents of the normalized second media asset at the sub-range of positions specified by the challenge matches the stored normalized media asset to which the matching second hash value corresponds;
  in response to determining that the received data that purports to be contents of the normalized second media asset at the sub-range of positions specified by the challenge does not match the stored normalized media asset to which the matching second hash value corresponds:
    omitting to store an indication that the second user is authorized to access a media asset equivalent to the second original media asset that is reconstituted from the normalized second media asset to which the matching second hash value corresponds; and
    storing an indication that the second user is not authorized to access any media assets.

11. The one or more memories of claim 1, the method further comprising:
  receiving from a second client device that is remote from the server and being used by a second user a plurality of media asset add requests each specifying a hash value to a normalized media asset stored on the second client;
  in response to each media asset add request, transmitting to the second client a challenge specifying a subrange of positions;
  determining that at least a threshold number of challenges have been transmitted to the second client device without response; and
  in response to determining that the threshold was satisfied, storing an indication that the second user is not authorized to access any media assets.

12. The one or more memories of claim 1 wherein also received from the first client device, in response to the challenge, is (c) license credentials for the first original media asset,
  the method further comprising:
    validating the received license credentials,
    and wherein storing the metadata and storing the indication are performed further in response to determining that the received license credentials are valid.

13. A method in a computing system having local storage, the computing system being used by a user, the method comprising:
  locating in the local storage a first original media asset;
  extracting metadata from the first original media asset;
  in a copy of the first original media asset:
    removing the extracted metadata, and
    after the removing, reordering the contents of the copy of the first original media asset that remain after removing the extracted metadata to conform their order to a predetermined order;
  determining a hash value for the normalized first media asset;
  transmitting the hash value to a server external to the computing system;
  receiving from the server a challenge specifying a sub-range of positions in the normalized first media asset;

transmitting to the server a representation of the contents of the normalized first media asset in the specified subrange of positions; and transmitting to the server the metadata extracted from the first original media asset, enabling the server to confirm that the normalized first media asset is present in the computing system, and thus establish state of the server permitting the user to access a copy of the normalized first media asset formerly stored on the server together with the metadata extracted from the first original media asset.

14. The method of claim 13, wherein the challenge further specifies a randomly-generated nonce, and wherein the transmitted representation is a result of applying a hashing function to the nonce concatenated with the contents of the normalized first media asset in the specified subrange of positions.

15. The method of claim 13, further comprising:

in the copy of the first original media asset, before the delivery:

updating at least one reference within the first original media asset to reflect the removing and the reordering to produce a normalized first media asset.

16. The method of claim 13, further comprising:

locating in the local storage a second original media asset;

extracting metadata from the second original media asset;

in a copy of the second original media asset:

removing the extracted metadata, and after the removing, reordering the remaining contents of the copy of the second original media asset that remain after removing the extracted metadata to conform their order to a predetermined order, determining a hash value for the normalized second media asset;

transmitting the hash value for the normalized second media asset to the server;

receiving from the server a request to upload the normalized second media asset;

transmitting to the server the normalized second media asset; and transmitting to the server the metadata extracted from the second original media asset, enabling the server to establish state of the server permitting the user to access a copy of the normalized second media asset together with the metadata extracted from the second original media asset.

17. One or more memories collectively having contents comprising a data structure relating to a first user who demonstrated possession of a first digital media asset and a second user who demonstrated possession of a second digital media asset, the data structure comprising:

a first portion containing common contents of the first and second digital media assets, wherein the first portion was obtained by extracting payload data from the first digital media asset and reordering it into a predefined order;

a second portion containing metadata extracted from the first digital media asset; and a third portion containing metadata extracted from the second digital media asset, wherein the first, second, and third portions are all represented distinctly from one another in the data structure, such that the contents of the data structure are usable to reconstitute the first digital media asset on behalf of the first user using the first and second portions, and such that the contents of the data structure are usable to reconstitute the second digital media asset on behalf of the second user using the first and third portions.

18. The one or more memories of claim 17, the data structure further comprising:

fourth data containing a hash result produced by hashing the first portion, such that the presence in the data structure of the fourth data is usable to test whether the first data is present in the data structure.

19. A method in a server, the method comprising:

receiving from a first client device on behalf of a first identified user a first request for a particular media asset; and in response to receiving the first request:

accessing a stored indication that the particular media asset was added to a media library of the identified first user with first metadata stored on the server, retrieving the first metadata, retrieving a normalized version of the particular media asset stored on the server, merging the retrieved first metadata with the retrieved normalized version of the particular media asset to obtain a first complete version of the particular media asset, and transmitting a response to the first client device having contents that provide access to the first complete version of the particular media asset.

20. The method of claim 19, further comprising:

receiving from the first client an access request for the particular media asset having the contents contained by the response; and conveying at least a portion of the results of the merging to the first client in response to receiving the access request, and wherein the accessing, retrieving, and merging are performed in response to receiving the access request.

21. The method of claim 19 wherein the first request contains a metadata query identifying the particular media asset.

22. The method of claim 19 wherein the first request contains a hash value identifying the particular media asset.

23. The method of claim 19, further comprising:

receiving from a second client device on behalf of a second identified user a second request for the particular media asset;

in response to receiving the second request:

accessing a stored indication that the particular media asset was added to a media library of the identified second user with second metadata stored on the server;

retrieving the second metadata;

retrieving a normalized version of the particular media asset stored on the server;

merging the retrieved second metadata with the retrieved normalized version of the particular media asset to obtain a second complete version of the particular media asset; and transmitting a response to the second client device having contents that provide access to the second complete version of the particular media asset.

24. The method of claim 19 wherein the transmitted response contains a client-specific URL usable to access the first complete version of the particular media asset.

25. The method of claim 24 wherein the time limited URL is usable to stream the first complete version of the particular media asset.

26. The method of claim 24 wherein the time limited URL is usable to retrieve the first complete version of the particular media asset.

27. The method of claim 19 wherein the contents of the retrieved normalized version of the particular media asset occur in the same order in the obtained first complete version of the particular media asset.

28. The method of claim 19, further comprising, as part of the merging:
- causing the contents of the retrieved normalized version of the particular media asset to be reordered within the obtained first complete version of the particular media asset.

* * * * *